United States Patent
Yamazaki et al.

(10) Patent No.: US 10,734,616 B2
(45) Date of Patent: Aug. 4, 2020

(54) POWER STORAGE DEVICE PACKAGING MATERIAL AND METHOD FOR MANUFACTURING POWER STORAGE DEVICE PACKAGING MATERIAL

(71) Applicant: TOPPAN PRINTING CO., LTD., Tokyo (JP)

(72) Inventors: Tomohiko Yamazaki, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/267,135

(22) Filed: Feb. 4, 2019

(65) Prior Publication Data
US 2019/0173061 A1   Jun. 6, 2019

Related U.S. Application Data

(63) Continuation of application No. PCT/JP2017/028097, filed on Aug. 2, 2017.

(30) Foreign Application Priority Data

Aug. 5, 2016 (JP) .................................. 2016-154863

(51) Int. Cl.
*H01M 2/02* (2006.01)
*H01G 11/78* (2013.01)
*B32B 15/20* (2006.01)

(52) U.S. Cl.
CPC ........... *H01M 2/0287* (2013.01); *B32B 15/20* (2013.01); *H01G 11/78* (2013.01);
(Continued)

(58) Field of Classification Search
CPC ............. H01M 2/0287; H01M 2/0202; H01M 2/0277; H01M 2/0285; H01M 2/0295; H01M 2/026
See application file for complete search history.

(56) References Cited

U.S. PATENT DOCUMENTS

2011/0250475 A1* 10/2011 Yamamoto .......... H01M 2/0277
429/7

FOREIGN PATENT DOCUMENTS

JP       2013-101765 A      5/2013
WO   WO-2013/069698 A1   5/2013
(Continued)

OTHER PUBLICATIONS

Abstract and Machine Translation in English of WO-2016010044. (Year: 2019).*
(Continued)

*Primary Examiner* — Robert S Jones
*Assistant Examiner* — Claire L Roe
(74) *Attorney, Agent, or Firm* — Foley Lardner LLP (57) ABSTRACT

The present invention relates to a power storage device packaging material. The packaging material includes at least a substrate protective layer, a substrate layer, an adhesive layer, a metal foil layer, a sealant adhesive layer, and a sealant layer in this order. The substrate protective layer is a cured product of a raw material containing a polyester resin and a polyisocyanate compound, has a glass transition temperature (Tg) of 60 to 140° C., and has a thickness of 1 to 5 μm, with a ratio of the thickness of the substrate protective layer to the thickness of the substrate layer being 35% or less.

6 Claims, 1 Drawing Sheet

(52) U.S. Cl.
CPC ......... *H01M 2/0202* (2013.01); *H01M 2/026* (2013.01); *H01M 2/0277* (2013.01); *H01M 2/0285* (2013.01); *H01M 2/0295* (2013.01); *H01M 2002/0297* (2013.01); *Y02E 60/13* (2013.01)

(56) References Cited

FOREIGN PATENT DOCUMENTS

| | | | |
|---|---|---|---|
| WO | WO-2016/010044 A1 | 1/2016 | |
| WO | WO-2016010044 A1 * | 1/2016 | ............. H01G 11/78 |

OTHER PUBLICATIONS

International Searching Authority, "International Search Report," issued in connection with International Patent Application No. PCT/JP2017/028097, dated Sep. 19, 2017.

International Searching Authority, "Written Opinion," issued in connection with International Patent Application No. PCT/JP2017/028097, dated Sep. 19, 2017.

* cited by examiner

POWER STORAGE DEVICE PACKAGING MATERIAL AND METHOD FOR MANUFACTURING POWER STORAGE DEVICE PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/028097, filed on Aug. 2, 2017, which is based upon and claims the benefit of priority to Japanese Patent Application No. 2016-154863, filed on Aug. 5, 2016; the disclosures of which are all incorporated herein by reference in their entireties.

TECHNICAL FIELD

The present invention relates to a power storage device packaging material and a method for manufacturing the power storage device packaging material.

BACKGROUND ART

Power storage devices include, for example, secondary batteries, such as lithium ion batteries, nickel hydride batteries, and lead batteries, and electrochemical capacitors, such as electric double layer capacitors. Due to miniaturization of mobile devices, limitation of installation spaces, or the like, power storage devices are required to be further miniaturized, and thus attention is being given to lithium ion batteries for their high energy density. Packaging materials for lithium ion batteries have conventionally been metal cans; however, multilayer films are increasingly used because they are lightweight, highly heat dissipating, and produced at low cost.

Such a lithium ion battery using a multilayer film as a packaging material employs a configuration in which battery contents (e.g., cathode, separator, anode, and electrolyte solution) are covered with a packaging material including an aluminum foil layer to thereby prevent moisture from penetrating into the battery. Lithium ion batteries employing such a configuration are referred to as aluminum laminated lithium ion batteries.

Embossed lithium ion batteries, for example, are known as aluminum laminated lithium ion batteries. Such an embossed lithium ion battery has a recess formed at part of the packaging material by cold forming, battery contents stored in the recess, and the rest of the packaging material folded back, with the edge portions heat-sealed. (See, for example, PTL 1). With these lithium ion batteries, a recess formed deeper by cold forming enables storage of more battery contents to achieve higher energy density.

CITATION LIST

[Patent Literature] [PTL 1] JP 2013-101765 A

SUMMARY OF THE INVENTION

Technical Problem

However, when deep drawing is performed on conventional packaging materials for lithium ion batteries to form a deep recess, the adhesive layer and the metal foil layer may be broken. Therefore, the packaging material is required to have good deep drawing formability.

In order to improve the formability, a nylon film may be used as a substrate layer for the outermost layer of the packaging material. However, the nylon film is dissolved and cannot exhibit characteristics as a packaging material if it comes into contact with an (acidic) electrolyte for lithium ion batteries because the nylon film is basic.

In one test for evaluating the long-term reliability of power storage device packaging materials, which is required by power storage device manufacturers, power storage devices are stored in a warm water environment for a certain period of time. During this time, depending on the power storage device packaging materials, interlayer separation (hereinafter, "delamination") occurs over time between a substrate layer and a metal foil layer of a packaging material.

The present invention has been made in view of the above circumstances. An object of the present invention is to provide power storage device packaging materials having good formability and electrolyte resistance, and suppressing delamination. Another object of the present invention is to provide a method for manufacturing such a power storage device packaging material.

Proposed Solution to the Problem

In order to achieve the above objects, the present invention provides a power storage device packaging material, the packaging material including at least a substrate protective layer, a substrate layer, an adhesive layer, a metal foil layer, a sealant adhesive layer, and a sealant layer in this order, where the substrate protective layer is a cured product of a raw material containing a polyester resin and a polyisocyanate compound, has a glass transition temperature (Tg) of 60 to 140° C., and has a thickness of 1 to 5 μm, with a ratio of the thickness of the substrate protective layer to the thickness of the substrate layer being 35% or less.

A power storage device packaging material of the present invention has good formability and electrolyte resistance, and suppresses delamination. In general, a nylon film is sometimes used as the outermost layer of a packaging material for a consumer lithium ion battery to improve the formability. However, the nylon is dissolved and cannot be used for a battery cell if the nylon film comes into contact with an (acidic) electrolyte for lithium ion storage devices because the nylon film is basic. The substrate layer may be a hygroscopic film (e.g., nylon film), and therefore delamination may occur due to water entering and being absorbed from the surface of the substrate layer. In order to solve such problems caused by films used, in the present invention, a coating layer formed by mixing a polyisocyanate compound into a polyester resin and having predetermined properties is provided as a substrate protective layer for the outermost layer of the film.

In the present invention, the substrate protective layer preferably has a glass transition temperature (Tg) of 100 to 140° C. This achieves higher deep drawing formability.

In the present invention, an anticorrosion treatment layer may be provided on one or both surfaces of the metal foil layer. This, for example, suppresses corrosion of the metal foil layer, and improves interlayer adhesion.

In the present invention, the ratio of the thickness of the substrate protective layer to the thickness of the substrate layer is preferably 3.5% or more. This achieves a sufficient substrate protection effect easily.

In the present invention, the raw material containing a polyester resin and a polyisocyanate compound may further contain a filler. This improves the formability and adds designability in appearance.

In the present invention, the substrate layer is preferably a polyamide film. This improves the formability easily.

The present invention also provides a method for manufacturing a power storage device packaging material, the method including adhering a substrate layer to one surface of a metal foil layer via an adhesive layer; forming a substrate protective layer on a surface of the substrate layer on the opposite side of the adhesive layer; and forming a sealant layer on a surface of the metal foil layer on the opposite side of the adhesive layer via a sealant adhesive layer, where the substrate protective layer is a cured product of a raw material containing a polyester resin and a polyisocyanate compound, has a glass transition temperature (Tg) of 60 to 140° C., and has a thickness of 1 to 5 μm, with a ratio of the thickness of the substrate protective layer to the thickness of the substrate layer being 35% or less. The manufacturing method of the present invention provides a power storage device packaging material that has good formability and electrolyte resistance, and suppresses delamination.

Desired Advantageous Effects of Invention

The present invention provides a power storage device packaging material that has good formability and electrolyte resistance, and suppresses delamination. The present invention also provides a method for manufacturing such a power storage device packaging material.

DESCRIPTION OF REPRESENTATIVE EMBODIMENTS

Figure 1:
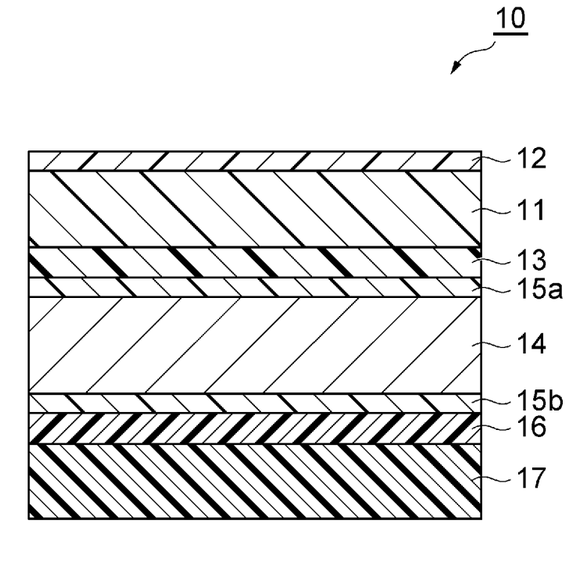
The FIGURE is a schematic cross sectional view of a power storage device packaging material according to an embodiment of the present application.

The preferred embodiments of the present invention will now be described in detail with reference to the drawings. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale.

[Power Storage Device Packaging Material]

The FIGURE is a schematic cross-sectional view of an embodiment of a power storage device packaging material of the present invention. As illustrated in the FIGURE, a packaging material (power storage device packaging material) 10 of the present embodiment is a laminate including a substrate layer 11, a substrate protective layer 12 provided on a surface of the substrate layer 11, an adhesive layer 13 provided on a surface of the substrate layer 11 on the opposite side of the substrate protective layer 12, a metal foil layer 14 provided on a surface of the adhesive layer 13 on the opposite side of the substrate layer 11 and having anticorrosion treatment layers 15a and 15b on opposing surfaces thereof, a sealant adhesive layer 16 provided on a surface of the metal foil layer 14 on the opposite side of the adhesive layer 13, and a sealant layer 17 provided on a surface of the sealant adhesive layer 16 on the opposite side of the metal foil layer 14. The anticorrosion treatment layer 15a is provided on a surface of the metal foil layer 14 on the adhesive layer 13 side and the anticorrosion treatment layer 15b is provided on a surface of the metal foil layer 14 on the sealant adhesive layer 16 side. In the packaging material 10, the substrate protective layer 12 is the outermost layer and the sealant layer 17 is the innermost layer. That is, the packaging material 10 is used, with the substrate protective layer 12 facing toward the outside of the power storage device and the sealant layer 17 facing toward the inside of the power storage device. Each layer will be described below.

(Substrate Layer 11)

The substrate layer 11 imparts heat resistance in a sealing process in the production of power storage devices, and suppresses the formation of pinholes that may occur during molding or distribution. Particularly in the case of, for example, packaging materials for large power storage devices, scratch resistance, chemical resistance, insulating properties, and the like, can also be imparted.

The substrate layer 11 preferably includes a resin film made of a resin having insulating properties. Examples of the resin film include stretched or unstretched films, such as polyester films, polyamide films, and polypropylene films. The substrate layer 11 may be a monolayer film made of one of these resin films, or a laminated film made of two or more of these resin films.

Of these films, the substrate layer 11 is preferably a polyamide film, and more preferably a biaxially stretched polyamide film, in terms of good formability. Examples of polyamide resins that form polyamide films include Nylon-6, Nylon-6,6, a copolymer of Nylon-6 and Nylon-6,6, Nylon-6,10, polymetaxylylene adipamide (MXD6), Nylon-11, and Nylon-12. Of these, nylon 6 (ONy) is preferred from the perspective of having good heat resistance, piercing strength and impact strength.

Examples of a stretching method for the biaxially stretched film include sequential biaxial stretching, tubular biaxial stretching, and simultaneous biaxial stretching. From the perspective of obtaining better deep drawing formability, the biaxially stretched film is preferably stretched using a tubular biaxial stretching method.

The substrate layer 11 preferably has a thickness of 6 to 40 μm, and more preferably 10 to 30 With the substrate layer 11 having a thickness of 6 μm or more, pinhole resistance and insulating properties are likely to be improved in the power storage device packaging material 10. If the substrate layer 11 has a thickness of more than 40 the total thickness of the power storage device packaging material 10 increases and the battery electrical capacity may need to be reduced; therefore, a thickness of more than 40 μm is not desirable.

(Substrate Protective Layer 12)

The substrate protective layer 12 is provided on one surface of the substrate layer 11, and is formed using a polyester resin and a polyisocyanate compound (curing agent). That is, the substrate protective layer 12 is a cured product of a raw material containing a polyester resin and a polyisocyanate compound.

The polyester resin is a copolymer using a polycarboxylic acid and a polyhydric alcohol as raw materials, and has reactive groups reactive with the curing agent in a side chain.

The polyester resin is preferably a polyester polyol. The polyester polyol is, for example, a polyester polyol obtained by reaction of at least one type of dicarboxylic acid with at least one type of compound having three or more hydroxyl groups. Unreacted parts of the compound having three or more hydroxyl groups are hydroxyl groups in a side chain of the polyester polyol.

As dicarboxylic acids in the polyester polyol, aliphatic dicarboxylic acids and aromatic dicarboxylic acids can be used. Specific examples thereof include aliphatic dicarboxylic acids, such as succinic acid, glutaric acid, adipic acid, pimelic acid, suberic acid, azelaic acid, sebacic acid, and brassylic acid; and aromatic dicarboxylic acids, such as isophthalic acid, terephthalic acid, and naphthalene dicarboxylic acid.

Examples of compounds having three or more hydroxyl groups include hexanetriol, trimethylolpropane, and pentaerythritol.

As a raw material of the polyester polyol, diols may be used as necessary, in addition to the compound containing the above dicarboxylic acids and three or more hydroxyl groups. Examples of diols include aliphatic diols, such as ethylene glycol, propylene glycol, butanediol, neopentyl glycol, methyl pentanediol, hexanediol, heptanediol, octanediol, nonanediol, decanediol, and dodecanediol; alicyclic diols, such as cyclohexanediol and hydrogenated xylylene glycol; and aromatic diols, such as xylylene glycol.

The number average molecular weight (Mn) of the polyester resin is preferably $3 \times 10^3$ to $20 \times 10^3$ from the perspective of electrolyte resistance and adhesion to the substrate layer 11.

As the curing agent, a polyisocyanate compound containing a plurality of isocyanate groups is used. The polyisocyanate compound cross-links the polyester resin. Examples of the chemical structure of the polyisocyanate compound include an adduct form, a biuret form, and an isocyanurate form.

Examples of isocyanate monomers of the polyisocyanate compound include an alicyclic diisocyanate (e.g., isophorone diisocyanate (IPDI)), aliphatic isocyanate (e.g., hexamethylene diisocyanate (HDI), and xylylene diisocyanate (XDI)), aromatic isocyanate (which is an isocyanate group directly coupled to an aromatic ring, e.g., tolylene diisocyanate (TDI), and diphenylmethane diisocyanate (MDI)), and hydrogenated products thereof. In addition, modified polyfunctional isocyanates obtained from one or more of these diisocyanates can be used.

Among the above isocyanates, aliphatic isocyanates are preferable, and adduct or biuret forms thereof are more preferable. In particular, an adduct or biuret form of hexamethylene diisocyanate is suitably used to impart electrolyte resistance. In addition, when such a curing agent is used, there is a tendency that alcohol resistance is also exhibited. For example, when a battery cell manufacturer performs printing with an inkjet printer for lot trace management, incorrect information is sometimes printed. In that case, reprinting is performed after the printed part is wiped with alcohol, and such a curing agent type is effective in terms of improving the wiping resistance to alcohol.

An isocyanate other than an alicyclic isocyanate may be used in combination with an alicyclic isocyanate. In this case, the power storage device packaging material 10 has good electrolyte resistance and alcohol resistance. In the present embodiment, the ratio ([a]/[b]) of the weight of the isocyanate other than an alicyclic isocyanate [a] to the weight of the alicyclic isocyanate [b] is preferably 99/1 to 80/20. If the ratio of the alicyclic isocyanate is higher than this range, the film as a coating layer becomes hard, and thus good formability is difficult to obtain. The alicyclic isocyanate, which has a bulky structure, is easily infiltrated with various chemicals (electrolyte and alcohol) or the like; thus, if the ratio of the alicyclic isocyanate is higher than this range, the chemical resistance and alcohol resistance tend to be impaired.

As the curing agent, the above isocyanate may be used in combination with a curing agent other than an isocyanate. Examples of other curing agents include melamine, compounds having carboxyl groups, compounds having glycidyl groups, compounds having hydroxyl groups, carbodiimides, amides, and amines, depending on substituents in a side chain of the polyester resin to be crosslinked.

The mixing ratio of the polyester resin, which is a main resin, and a curing agent is preferably such that the ratio of [B]/[A] is 5 to 60, where [A] is the number of moles of reactive groups of the polyester resin, and [B] is the number of moles of reactive groups of the polyisocyanate compound. The resistance to electrolytes is considered to be affected by the crosslinked structure of the substrate protective layer 12. Accordingly, the inventors consider it to be necessary to increase the cross-link density by mixing the reactive groups of the curing agent in an excess amount relative to the reactive groups of the polyester resin. When the ratio of [B]/[A] is 5 or more, the crosslinked structure is sufficient, and the electrolyte resistance is better. In contrast, when the ratio of [B]/[A] is 60 or less, the crosslinked structure is not overly dense (the substrate protective layer 12 is not overly hard), and desirable influence is exerted on molding or the like. If the curing agent ratio is low, the adhesion between the substrate protective layer 12 and the substrate layer 11 is less likely to be obtained; thus, the above range is preferable. From such a viewpoint, the ratio of [B]/[A] is more preferably 5 to 60.

As described above, the substrate protective layer 12 is formed using a raw material containing a polyester resin and a curing agent. The raw material may also contain various additives, such as fillers, flame retardants, lubricants (slip agents), anti-blocking agents, antioxidants, photostabilizers, tackifiers, leveling agents for imparting coating stability, various stabilizers, such as antifoaming agents, catalysts for preventing blocking after coating (promoting the reaction of the coating agent), and reaction retardants for controlling the pot life of the coating agent (acetylacetone being suitably used).

If the raw material contains a filler, matte treatment can be performed on the outer surface of the substrate protective layer 12. The substrate protective layer 12 in the present embodiment is a coating layer formed of a raw material containing a polyester resin and a curing agent. Accordingly, when surface roughness is adjusted by matte treatment, the sliding properties of the surface of the substrate protective layer 12 are improved, and the packaging material 10 can be easily prevented from overly adhering to the die during cold forming; thus, good formability is more likely to be ensured. Moreover, because a matte effect or the like can also be obtained by matte treatment, appearance designability can be imparted to the packaging material 10 by, for example, adjusting the amount of the filler.

Examples of the filler that can be used include fine particles of inorganic materials (inorganic fillers), such as silica, alumina, barium sulfate, calcium carbonate, and titanium oxide; and acrylic beads, urethane beads, polyester beads, and polyolefin beads (organic fillers). Of these, silica fine particles are preferable because resin cracks (blushing due to fine cracks) are less likely to be formed during press molding of the packaging material. In particular, using fine particles of silica subjected to hydrophobic treatment as a filler, dispersibility during coating is improved, and the filler can be uniformly dispersed in the substrate protective layer. The mean particle size of the filler can be selected as necessary. The filler size is preferably submicron (nm order) to less than 10 µm because it is difficult to control the thickness of the power storage device packaging material. In this case, fillers having different particle size distributions may be blended. The mean particle size can be measured by a Coulter counter method.

The content ratio of the filler in the substrate protective layer 12 (the content ratio of the filler relative to the total mass of the substrate protective layer 12) is preferably 1 to 50 mass %. By setting the content ratio of the filler to 1 mass % or more, sliding properties can be easily imparted to the surface of the substrate protective layer 12. By setting the content ratio of the filler to 50 mass % or less, film roughness of the surface of the substrate protective layer 12 can be easily prevented. Defects in the appearance of the surface of the packaging material 10 can thereby be prevented.

Examples of lubricants include fatty acid amides, such as oleic acid amide, erucic acid amide, stearic acid amide, behenic acid amide, ethylene bis-oleic acid amide, and ethylene bis-erucic acid amide. Preferable anti-blocking agents are various filler-based anti-blocking agents, such as silica.

The above additives may be used singly or in combination of two or more.

The glass transition temperature (Tg) of the substrate protective layer 12 is 60 to 140° C. If Tg is less than 60° C., the tackiness of the substrate protective layer 12 increases, so that blocking occurs; and the hardness as a cured film is insufficient, so that deep drawing is impossible in cold forming. In contrast, if Tg is more than 140° C., the cured film is excessively hard, and the layer is rather fragile, so that cold forming cannot be performed in sufficient drawing depth. Furthermore, if the glass transition temperature (Tg) of the substrate protective layer 12 is 100° C. or more, preferably 120° C. or more, the substrate protective layer 12 will be sufficiently soft to have higher resistance to drawing during deep drawing, and will be sufficiently hard to have higher resistance to shear stress exerted on the substrate protective layer 12 during drawing, so that higher deep drawing formability can be obtained. From these perspectives, Tg is preferably 100 to 140° C. and more preferably 120 to 140° C. The glass transition temperature (Tg) of the substrate protective layer 12 can be measured by a rigid-body pendulum method (Rigid-body Pendulum Type Physical Properties Testing Instrument RPT-3000W, manufactured by A & D Co., Ltd.).

The substrate protective layer 12 is a cured product formed by curing a polyester resin using a polyisocyanate compound, and thus tends to be harder than the substrate layer 11 (e.g., nylon film). Therefore, if the substrate protective layer 12 is excessively thick, drawing of the substrate layer 11 is inhibited by the substrate protective layer 12 during cold forming. In this case, the substrate layer 11 will not be sufficiently drawn for cold forming. This leads to elastic recovery of the substrate layer 11 during subsequent accelerated environmental testing, so that delamination is likely to occur between the substrate layer 11 and the metal foil layer 14. In contrast, an excessively thin substrate protective layer 12 cannot achieve the original purpose of protecting the substrate layer 11.

From the above viewpoints, the ratio of the thickness of the substrate protective layer 12 to the thickness of the substrate layer 11 is 35% or less, preferably 25% or less. In addition, this ratio is preferably 3.5% or more, and more preferably 5% or more.

The substrate protective layer 12 has a thickness of 1 to 5 µm. If the thickness is less than 1 µm, water easily permeates (enters) the substrate protective layer 12 from its surface, and thus delamination may occur, or the substrate protective layer 12 may be broken during forming. Delamination tends to occur for the same reason if the thickness is more than 5 µm. From these viewpoints, the substrate protective layer 12 preferably has a thickness of 1.5 to 3 µm.

(Adhesive Layer 13)

The adhesive layer 13 adheres the substrate layer 11 to the metal foil layer 14. The adhesive layer 13 has an adhesive force needed to firmly adhere the substrate layer 11 to the metal foil layer 14 and also has conformability (ability to reliably form the adhesive layer 13 on a member without separation, even when the member is deformed, stretched or contracted) to prevent breaking of the metal foil layer 14 by the substrate layer 11 during cold forming.

An adhesive constituting the adhesive layer 13 can be a two-part curing type polyurethane adhesive containing, for example, a main resin made of a polyol such as a polyester polyol, a polyether polyol, and an acrylic polyol, and a curing agent such as an aromatic or aliphatic isocyanate. In this adhesive, the molar ratio (=[NCO]/[OH]) of the isocyanate groups of the curing agent to the hydroxyl groups of the main resin is preferably 1 to 10, and more preferably 2 to 5.

After being applied, the polyurethane adhesive is aged at 40° C. or more for 4 days or longer, for example. This advances the reaction of the hydroxyl group of the main resin with the isocyanate group of the curing agent, allowing more firm adhesion of the substrate layer 11 to the metal foil layer 14.

From the perspective of obtaining desired adhesive strength, conformability, processability, and the like, the thickness of the adhesive layer 13 is preferably 1 to 10 µm, and more preferably 2 to 6 µm.

A suitable amount of pigment may be added to the adhesive layer 13 to impart designability. The pigment may be an organic pigment, an inorganic pigment, or a mixture of these pigments.

The type of pigment is not limited within a range that does not impair the adhesion of the adhesive layer 13. Examples of organic pigments include azo-based pigments, phthalocyanine-based pigments, quinacridone-based pigments, anthraquinone-based pigments, dioxazine-based pigments, indigo-thioindigo-based pigments, purinone-perylene-based pigments, and isoindolenin-based pigments; and examples of inorganic pigments include carbon black-based pigments, titanium oxide-based pigments, cadmium-based pigments, lead-based pigments, and chromium oxide-based pigments, as well as mica fine powder, fish scale foil, and the like.

Specific examples of organic pigments include the following pigments:

Yellow: isoindolinone, isoindoline, quinophthalone, anthraquinone (flavanthrone), azomethine, xanthene, etc.

Orange: diketo-pyrrolo-pyrrole, perylene, anthraquinone, perinone, quinacridone, etc.

Red: anthraquinone, quinacridone, diketo-pyrrolo-pyrrole, perylene, indigoid, etc.

Purple: oxazine (dioxazine), quinacridone, perylene, indigoid, anthraquinone, xanthene, benzimidazolone, violanthrone, etc.

Blue: phthalocyanine, anthraquinone, indigoid, etc.

Green: phthalocyanine, perylene, azomethine, etc.

Specific examples of inorganic pigments include the following pigments:

White: zinc white, lead white, lithopone, titanium dioxide, precipitated barium sulfate, baryta powder, etc.

Red: red lead, iron oxide red, etc.

Yellow: chrome yellow, zinc yellow (zinc yellow type 1, zinc yellow type 2), etc.

Blue: ultramarine blue, Prussian blue (potassium ferric ferrocyanide), etc.

Black: carbon black etc.

The content of pigment is preferably 1 mass % or more, and more preferably 5 mass % or more, relative to the total mass of the adhesive layer 13, because higher reliability can be obtained. Moreover, the content of pigment is preferably 50 mass % or less, and more preferably 20 mass % or less, because good adhesion can be obtained.

(Metal Foil Layer 14)

Examples of the metal foil layer 14 include various types of metal foil such as of aluminum and stainless steel. The metal foil layer 14 is preferably aluminum foil from the perspective of processability, such as moisture resistance and ductility and malleability, and costs. The aluminum foil is preferably an aluminum foil containing iron from the viewpoint of good pinhole resistance, and ductility and malleability during forming.

The aluminum foil (100 mass %) containing iron preferably has an iron content in the range of 0.1 to 9.0 mass % and more preferably 0.5 to 2.0 mass % (e.g., aluminum foil made of the material 8021 or 8079 according to the Japanese Industrial Standards). The iron content of 0.1 mass % or more leads to a packaging material 10 having better pinhole resistance, and ductility and malleability. The iron content of 9.0 mass % or less leads to a packaging material 10 having better flexibility.

From the perspective of imparting desired ductility and malleability during forming, an annealed soft aluminum foil is even more preferred as the aluminum foil.

The metal foil used for the metal foil layer 14 may be degreased, for example, to obtain desired electrolyte resistance.

From the perspective of barrier properties, pinhole resistance, and processability, the metal foil layer 14 preferably has a thickness of 9 to 200 μm, more preferably 15 to 150 μm, and even more preferably 15 to 100 μm. The metal foil layer 14 with a thickness of 9 μm or more is less breakable even when stress is applied thereto by molding. The metal foil layer 14 with a thickness of 200 μm or less curbs an increase in mass of the packaging material and minimizes a decrease in weight energy density of the power storage device.

(Anticorrosion Treatment Layers 15a and 15b)

The anticorrosion treatment layers 15a and 15b suppress corrosion of the metal foil layer 14 due to the electrolyte or hydrofluoric acid produced by reaction of the electrolyte with water. The anticorrosion treatment layer 15a increases the adhesive force between the metal foil layer 14 and the adhesive layer 13. The anticorrosion treatment layer 15b increases the adhesive force between the metal foil layer 14 and the sealant adhesive layer 16. The anticorrosion treatment layers 15a and 15b may be identically formed or may be differently formed.

The anticorrosion treatment layers 15a and 15b can be formed by, for example, applying degreasing treatment, hydrothermal conversion treatment, anodizing treatment, chemical conversion treatment, or coating-type anticorrosion treatment where a coating agent having anticorrosion ability is applied, or a combination of these treatments, to a layer serving as a base material for the anticorrosion treatment layers 15a and 15b.

Of the above treatments, hydrothermal conversion treatment and anodizing treatment in particular are ones where the metal foil (aluminum foil) is dissolved with a treatment agent on the surface thereof to form a metal compound (aluminum compound (boehmite, alumite)) having good corrosion resistance. In this sense, these treatments may be embraced within the definition of chemical conversion treatments because they provide a co-continuous structure that is formed covering from the metal foil layer 14 to the anticorrosion treatment layers 15a and 15b.

Examples of the degreasing treatment include acid degreasing treatment and alkaline degreasing treatment. The acid degreasing treatment may be one using the inorganic acid mentioned above, such as sulfuric acid, nitric acid, hydrochloric acid, and hydrofluoric acid, singly or using acid obtained by mixing them, or the like. As the acid degreasing treatment, using an acid degreasing agent obtained by dissolving a fluorine-containing compound, such as monosodium ammonium bifluoride, with the above inorganic acid can not only achieve the degreasing effect on the metal foil layer 14, but form a passive metal fluoride, and is thus effective in terms of hydrofluoric acid resistance. The alkaline degreasing treatment may be one using sodium hydroxide, or the like.

For example, the hydrothermal conversion treatment may be boehmite treatment using boehmite obtained by immersing the metal foil layer 14 in boiling water with triethanolamine added thereto. For example, the anodizing treatment that can be used may be alumite treatment. Examples of the chemical conversion treatment that can be used include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the above-mentioned degreasing treatment is preferably performed in advance.

The chemical conversion treatment is not limited to a wet type, but may be one, for example, in which treatment agents used for the treatment are mixed with a resin component and applied. The anticorrosion treatment may preferably be of a coating type chromate treatment because it maximizes the anticorrosion effect and is convenient for liquid waste disposal.

The coating agent used in the coating type anticorrosion treatment where a coating agent having anticorrosion ability is applied includes one which contains at least one selected from the group consisting of a rare earth element oxide sol, an anionic polymer, and a cationic polymer. In particular, a preferred method is one using a coating agent containing a rare earth element oxide sol.

The anticorrosion treatment layers 15a and 15b preferably have mass per unit area in the range of 0.005 to 0.200 g/m$^2$, and more preferably 0.010 to 0.100 g/m$^2$. With 0.005 g/m$^2$ or more, the metal foil layer 14 can be easily made corrosion-resistant. The mass per unit area exceeding 0.200 g/m$^2$ will saturate the anticorrosivity, and no further anti-corrosion effect can be expected. For the anticorrosion treatment layers 15a and 15b described here using mass per unit area, the specific gravity, if available, can be used in terms of thickness.

The respective thicknesses of the anticorrosion treatment layers 15a and 15b are preferably, for example, 10 nm to 5 µm, and more preferably 20 to 500 nm, from the perspective of anticorrosive and anchoring functions.

(Sealant Adhesive Layer 16)

The sealant adhesive layer 16 adheres the sealant layer 17 to the metal foil layer 14 formed with the anticorrosion treatment layer 15b. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft modifying a polyolefin-based resin with acid. The acid modified polyolefin-based resin, which has a polar group introduced into part of the nonpolar polyolefin-based resin, can firmly adhere to both the sealant layer 17 composed of a nonpolar polyolefin-based resin film or the like, and the anticorrosion treatment layer 15b, which is often polar. Use of the acid modified polyolefin-based resin improves resistance of the packaging material 10 to the contents, such as the electrolyte, and easily prevents lowering of the adhesive force due to deterioration of the sealant adhesive layer 16 even when hydrofluoric acid is produced inside the battery.

Examples of the polyolefin-based resin for the acid modified polyolefin-based resin include low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin that can be used may also be a copolymer obtained by copolymerizing polar molecules such as of acrylic acid or methacrylic acid with those materials mentioned above, a polymer such as cross-linked polyolefin, or the like. The acid to modify the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the abovementioned adhesive component with an extruder. The sealant adhesive layer 16 of the heat lamination structure preferably has a thickness of 5 to 50 µm.

The adhesive component forming the sealant adhesive layer 16 of the dry lamination structure may be ones, for example, similar to those mentioned for the adhesive layer 13. In this case, to prevent or reduce swelling due to the electrolyte, and hydrolysis due to hydrofluoric acid, the composition of the adhesive is preferably designed so as to contain a main resin with a backbone not easily hydrolyzed and improve cross-link density.

To improve cross-link density, another substance may be added to the adhesive, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid is obtained by dimerizing various unsaturated fatty acids, and can have a structure, for example, of acyclic type, monocyclic type, polycyclic type, and aromatic ring type.

The sealant adhesive layer 16 having the dry laminate structure has a bonding part such as of an ester group and a urethane group which is easily hydrolysable. Therefore, for usage requiring higher reliability, an adhesive component having a heat lamination structure is preferably used as the sealant adhesive layer 16. For example, the various curing agents mentioned above are blended into a coating agent where the acid modified polyolefin resin is dissolved or dispersed in a solvent, such as toluene or methylcyclohexane (MCH), and are applied and dried to thereby form the sealant adhesive layer 16. In this case, the sealant adhesive layer 16 of the dry laminate structure may contain a compound that can be covalently bound to a compound in the anticorrosion treatment layer 15b. The curing agent used in this case is, for example, at least one compound selected from the group consisting of polyfunctional isocyanate compounds, glycidyl compounds, compounds having a carboxyl group, and compounds having an oxazoline group.

In the case of forming the sealant adhesive layer 16 by extrusion molding, the adhesion resin tends to be oriented in MD (extrusion direction) due to the stress or the like generated during the extrusion molding. In this case, to alleviate the anisotropy of the sealant adhesive layer 16, an elastomer may be blended in the sealant adhesive layer 16. As the elastomer to be blended in the sealant adhesive layer 16, for example, an olefin-based elastomer, a styrene-based elastomer, or the like may be used.

The sealant adhesive layer 16 of the heat lamination structure preferably has a thickness of 5 to 50 µm, and more preferably 20 to 40 µm. The sealant adhesive layer 16 having a thickness of 8 µm or more can easily provide sufficient adhesion strength between the metal foil layer 14 and the sealant layer 17. The sealant adhesive layer 16 having a thickness of 50 µm or less can easily reduce the amount of water penetrating from an end surface of the packaging material into the battery element inside. The sealant adhesive layer 16 of the dry lamination structure preferably has a thickness of 1 to 5 µm. The sealant adhesive layer 16 having a thickness of 1 µm or more can easily provide sufficient adhesion strength between the metal foil layer 14 and the sealant layer 17. The sealant adhesive layer 16 having a thickness of 5 µm or less prevents or reduces cracking therein.

(Sealant Layer 17)

The sealant layer 17 imparts sealability to the packaging material 10 when heat sealed, and is located on the inward side for heat sealing when the power storage device is assembled. The sealant layer 17 may be a resin film made of a polyolefin-based resin or an acid-modified polyolefin-based resin obtained by graft-modifying a polyolefin-based resin with acid such as maleic anhydride. Examples of the polyolefin-based resin include low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

Among these, the sealant layer 17 is preferably a polyolefin-based resin that can improve water vapor barrier properties and that can configure the form of the power storage device without being excessively deformed by heat sealing; polypropylene is particularly preferable.

Some substances may be added to the above types of polypropylenes, that is, random polypropylene, homo polypropylene, and block polypropylene. Examples of these substances include low crystallinity ethylene-butene copolymer; low crystallinity propylene-butene copolymer; terpolymer formed of a three-component copolymer of ethylene, butene, and propylene; an anti-blocking agent (AB agent), such as silica, zeolite, and acrylic resin beads; and a slip agent, such as a fatty acid amide.

The acid-modified polyolefin-based resin includes, for example, those resins similar to ones mentioned for the sealant adhesive layer 16.

The sealant layer 17 may be a single layer film or a multilayer film, which may be selected according to the required function. For example, to impart moisture resistance, a multilayer film with interposition of resins, such as an ethylene-cyclic olefin copolymer and polymethylpentene, may be used.

The sealant layer 17 may contain various additives, such as a flame retardant, a slip agent, an anti-blocking agent, an antioxidant, a photostabilizer, and a tackifier.

The sealant layer 17 preferably has a thickness of 10 to 100 and more preferably 20 to 60 The sealant layer 17 with a thickness of 20 µm or more achieves sufficient heat sealing strength. The sealant layer 17 with a thickness of 90 µm or less reduces the amount of water vapor penetrating from an end of the packaging material.

[Method for Manufacturing the Packaging Material]

A method for manufacturing the packaging material 10 will now be described. The method for manufacturing the packaging material 10 is not limited to the following method.

For example, the method for manufacturing the packaging material 10 may involve the following steps S11 to S14.

Step S11: Forming the anticorrosion treatment layer 15a on a surface of a metal foil layer 14 and forming the anticorrosion treatment layer 15b on the other surface of the metal foil layer 14.

Step S12: Bonding a surface of the anticorrosion treatment layer 15a on the opposite side of the metal foil layer 14 to the substrate layer 11 via the adhesive layer 13.

Step S13: Forming the substrate protective layer 12 on a surface of the substrate layer 11 on the opposite side of the adhesive layer 13.

Step S14: Forming the sealant layer 17 on a surface of the anticorrosion treatment layer 15b on the opposite side of the metal foil layer 14 via the sealant adhesive layer 16.

(Step S11)

At step S11, the anticorrosion treatment layer 15a is formed on a surface of the metal foil layer 14 and the anticorrosion treatment layer 15b is formed on the other surface of the metal foil layer 14. The anticorrosion treatment layers 15a and 15b may be formed separately or simultaneously. Specifically, for example, an anticorrosion treatment agent (base material of the anticorrosion treatment layers) is applied to both surfaces of the metal foil layer 14, followed by drying, curing, and baking sequentially to simultaneously form the anticorrosion treatment layers 15a and 15b. Alternatively, an anticorrosion treatment agent may be applied to a surface of the metal foil layer 14, sequentially followed by drying, curing, and baking to form the anticorrosion treatment layer 15a; and then the anticorrosion treatment layer 15b may be similarly formed on the other surface of the metal foil layer 14. The order of forming the anticorrosion treatment layers 15a and 15b is not limited. The anticorrosion treatment agent to be used may be different or the same between the anticorrosion treatment layers 15a and 15b. As the anticorrosion treatment agent, for example, one for coating type chromate treatment, or the like may be used. Examples of the method of applying the anticorrosion treatment include, but not limited to, gravure coating, gravure reverse coating, roll coating, reverse roll coating, die coating, bar coating, kiss coating, and comma coating. As the metal foil layer 14, an untreated metal foil layer may be used, or a metal foil layer subjected to wet or dry degreasing treatment may be used.

(Step S12)

At step S12, a surface of the anticorrosion treatment layer 15a on the opposite side of the metal foil layer 14 is bonded to the substrate layer 11 by dry lamination using an adhesive forming the adhesive layer 13. At step S13, aging treatment may be performed at a temperature in the range of room temperature to 100° C. to accelerate adhesion. The aging time is, for example, 1 to 10 days.

(Step S13)

At step S13, the substrate protective layer 12 is formed on a surface of the substrate layer 11 on the opposite side of the adhesive layer 13. First, a raw material for forming the substrate protective layer 12 (a coating agent prepared by mixing a polyisocyanate compound into a polyester resin diluted with a solvent) is prepared. In this case, various stabilizers, such as leveling agents and antifoaming agents, may be mixed into the raw material to impart coating stability. Moreover, various catalysts may be mixed thereinto to prevent blocking after coating, and to promote the reaction of the coating agent. In that case, reaction retardants may be mixed thereinto to control the pot life of the coating agent. Acetylacetone or the like is suitable for the reaction retardant. Then, the coating agent is applied to the substrate layer 11 using a known method, and dried by heating. Examples of such a coating method include gravure direct coating, gravure reverse coating (direct coating, kiss coating), bar coater coating, and the like. When the filler mentioned above is mixed, a slurry prepared by previously dispersing the filler in a solvent may be mixed with a resin varnish, or the filler may be directly dispersed in a previously-prepared resin varnish coating agent. It is also possible to mix other additives, such as a curing agent, into these filler-mixed liquids. The timing of forming the substrate protective layer 12 is not limited to the present embodiment.

(Step S14)

Following step S13, the sealant layer 17 is formed, via the sealant adhesive layer 16, on a surface of the anticorrosion treatment layer 15b on the opposite side of the metal foil layer 14 in the laminate having the substrate protective layer 12, the substrate layer 11, the adhesive layer 13, the anticorrosion treatment layer 15a, the metal foil layer 14, and the anticorrosion treatment layer 15b in this order. The sealant layer 17 may be laminated by dry lamination, sandwich lamination, or the like, or may be laminated together with the sealant adhesive layer 16 by coextrusion. To improve adhesion, the sealant layer 17 is preferably laminated by, for example, sandwich lamination or laminated together with the sealant adhesive layer 16 by coextrusion, and is more preferably laminated by sandwich lamination.

The packaging material 10 is obtained through the steps S11 to S14 described above. The order of steps in the method for manufacturing the packaging material 10 is not limited to the method sequentially performing the steps S11 to S14, and the order of performing steps may be appropriately changed.

[Power Storage Device]

A power storage device provided with the packaging material 10 as a container will now be described. The power storage device includes a battery element including electrodes, leads extending from the electrodes, and a container holding the battery element. The container is formed of the power storage device packaging material 10, with the sealant layer 17 inside. The container may be obtained by overlapping two packaging materials with the sealant layers 17 face-to-face, and heat-sealing the edge portions of the overlapped packaging materials 10, or may be obtained by folding a single packaging material so that the surfaces are overlapped with each other and similarly heat-sealing the edge portions of the packaging material 10. The packaging material of the present embodiment can be used for various power storage devices. Examples of the power storage device include secondary batteries, such as lithium ion batteries, nickel hydride batteries, and lead batteries, and electrochemical capacitors, such as electric double layer capacitors.

The leads are sandwiched and hermetically sealed by the packaging material 10 forming the container with the sealant layer 17 inside. The leads may be sandwiched by the packaging material 10 via a tab sealant.

EXAMPLE

In the following, the present invention will be described in more detail based on Examples. However, the present invention should not be limited to the following Examples.

Example 1

As the metal foil layer 14, soft aluminum foil 8079 having a thickness of 35 μm (manufactured by Toyo Aluminium K.K.) was used. A sodium polyphosphate-stabilized cerium oxide sol (anticorrosion treatment agent) was applied to one surface of the metal foil layer 14 by gravure coating. The sol was prepared using distilled water as a solvent and controlled to have a solid content concentration of 10 mass %. The sol contained 10 parts by mass of phosphoric acid, relative to 100 parts by mass of cerium oxide. Then, the anticorrosion treatment agent was dried and baked to form an anticorrosion treatment layer 15a.

A sodium polyphosphate-stabilized cerium oxide sol (anticorrosion treatment agent) was applied by gravure coating to a surface of the metal foil layer 14 on the opposite side of the anticorrosion treatment layer 15a. The sol was prepared using distilled water as a solvent and controlled to have a solid content concentration of 10 mass %. The sol contained 10 parts by mass of phosphoric acid, relative to 100 parts by mass of cerium oxide. Then a mixture of polyallylamine of 90 parts by mass and a glycidyl compound of 10 parts by mass, with the solid content concentration adjusted to 5 mass % using distilled water as a solvent, was applied to an anticorrosion treatment layer formed by drying and baking the anticorrosion treatment agent, followed by baking to form an anticorrosion treatment layer 15b.

Next, a nylon film having a thickness of 15 μm was used as a substrate layer 11, and corona treatment was performed on one surface of the substrate layer 11.

Then, a polyurethane-based adhesive (thickness: 3 μm) was applied as the adhesive layer 13 to a surface of the anticorrosion treatment layer 15a on the opposite side of the metal foil layer 14. The metal foil layer 14 was then adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in atmospheric air at a temperature of 60° C. for 6 days for aging treatment.

Subsequently, a coating liquid for forming a substrate protective layer was prepared, applied by reverse roll coating to a surface of the substrate layer 11 on the opposite side of the adhesive layer 13, and dried to form a substrate protective layer 12 having a thickness of 1 μm. As the coating liquid for forming a substrate protective layer, a coating liquid was used in which a mixture of HDI-adduct form:IPDI-isocyanurate form=90:10 (weight ratio) was contained as a polyisocyanate in aromatic polyester polyols having a Tg of 60° C. as a polyester resin. The Tg of the substrate protective layers 12 in Table 1 was measured by a rigid-body pendulum method (Rigid-body Pendulum Type Physical Properties Testing Instrument RPT-3000W, manufactured by A & D Co., Ltd.) under the conditions that intervals between measurements were 6 seconds, the pendulum capture duration was 2 seconds, the type of a frame was FRB-100, and the shape of a measurement part was RBP-020.

Then, maleic anhydride modified polypropylene (Trade name: ADMER, manufactured by Mitsui Chemicals, Inc.) serving as a base material was extruded to form a sealant adhesive layer 16 on a surface of the anticorrosion treatment layer 15b on the opposite side of the metal foil layer 14. The thickness of the sealant adhesive layer 16 was set to 15 μm. Then, a polyolefin film with a thickness of 20 μm (non-stretched polypropylene film having a corona-treated surface on the sealant adhesive layer 16 side) serving as the sealant layer 17 was bonded (heat-pressure bonded) to the anticorrosion treatment layer 15b at 180° C. via the sealant adhesive layer 16 by sandwich lamination. A power storage device packaging material 10 was thus produced.

Examples 2 to 7 and Comparative Examples 1 and 10

Power storage device packaging materials 10 were produced similarly to Example 1, except that the substrate layer 11 and the substrate protective layer 12 were configured as shown in Table 1. Except for Comparative Examples 7 and 8, Tg was adjusted by changing the mixing ratio of a polyester resin and a polyisocyanate. For Comparative Examples 7 and 8, Tg was adjusted using aromatic polyester polyols having a Tg of 20° C. instead of aromatic polyester polyols having a Tg of 60° C.

Examples 8 to 11

Power storage device packaging materials 10 were produced similarly to Example 1, except that silica fillers or acrylic fillers mentioned below were contained in the coating liquid for forming a substrate protective layer so as to be 10 mass % relative to the total mass of a substrate protective layer 12 to be formed, and that the substrate layer 11 and the substrate protective layer 12 were configured as shown in Table 1.

Silica filler: a mean particle size of 3 μm (having a hydrophobic surface).

Acrylic filler: a mean particle size of 3 μm

TABLE 1

| | Substrate protective layer | | | Substrate layer Thickness (μm) | Thickness ratio % |
|---|---|---|---|---|---|
| | Filler | Tg (° C.) | Thickness (μm) | | |
| Example 1 | None | 115 | 1 | 15 | 6.7 |
| Example 2 | | 120 | 1 | 15 | 6.7 |
| Example 3 | | 135 | 1 | 25 | 4.0 |
| Example 4 | | 125 | 3 | 15 | 20.0 |
| Example 5 | | 125 | 3 | 25 | 12.0 |
| Example 6 | | 130 | 5 | 15 | 33.3 |
| Example 7 | | 140 | 5 | 25 | 20.0 |

TABLE 1-continued

| | Substrate protective layer | | | Thickness ratio % |
|---|---|---|---|---|
| | Filler | Tg (° C.) | Thickness (μm) | Substrate layer Thickness (μm) | |

| | Filler | Tg (° C.) | Thickness (μm) | Substrate layer Thickness (μm) | Thickness ratio % |
|---|---|---|---|---|---|
| Comparative Example 1 | | 125 | 0.5 | 15 | 3.3 |
| Comparative Example 2 | | 130 | 0.5 | 25 | 2.0 |
| Comparative Example 3 | | 125 | 0.25 | 15 | 1.7 |
| Comparative Example 4 | | 125 | 0.25 | 25 | 1.0 |
| Comparative Example 5 | | 125 | 7 | 15 | 46.7 |
| Comparative Example 6 | | 125 | 7 | 25 | 28.0 |
| Comparative Example 7 | | 50 | 3 | 15 | 20.0 |
| Comparative Example 8 | | 50 | 3 | 25 | 12.0 |
| Comparative Example 9 | | 145 | 3 | 15 | 20.0 |
| Comparative Example 10 | | 145 | 3 | 25 | 12.0 |
| Example 8 | Silica | 130 | 3 | 15 | 20.0 |
| Example 9 | Silica | 130 | 3 | 25 | 12.0 |
| Example 10 | Acryl | 130 | 3 | 15 | 20.0 |
| Example 11 | Acryl | 130 | 3 | 25 | 12.0 |

*Thickness ratio: the ratio of the thickness of the substrate protective layer to the thickness of the substrate layer <Evaluation of Electrolyte Resistance>

An electrolyte (ethylene carbonate/dimethyl carbonate/diethyl carbonate=1:1:1 wt %, LiPF6, 1 M) having minute amounts of water (1500 ppm) added was dropped to the substrate protective layer 12 of each packaging material obtained in the Examples and Comparative Examples, and wiped with isopropyl alcohol after 10 minutes. Thereafter, the appearance of the dropping part was evaluated according to the following criteria. The results are shown in Table 2.

∘: No traces of dropped electrolytes were recognized.

Δ: A trace of dropped electrolytes was recognized.

x: Electrolytes reached and dissolved the substrate layer.

<Evaluation on Forming Depth>

For the packaging materials obtained in the Examples and Comparative Examples, forming depth of deep drawing was evaluated by the following method. First, each power storage device packaging material 10 was arranged in a forming apparatus, with the sealant layer 17 facing upward. The forming depth of the forming apparatus was set to a ratio of 1.0 to 3.5 mm per 0.25 mm and the packaging material was cold-formed in an environment of 23° C. room temperature and −35° C. dew point temperature. The punch used had a rectangular transverse cross-section of 70 mm×80 mm, a bottom with 1.00 mm punch radius (RP), and a side face with 1.00 mm punch corner radius (RCP). The die used had an open top with 1.00 mm die radius (RD). The presence/absence of breakage and pinholes in the cold-formed area was visually checked by irradiating the packaging material with light to thereby obtain the maximum value of the forming depth in which deep drawing was possible without causing breakage or pinholes. Moreover, the forming depth was evaluated according to the following criteria. The results are shown in Table 2.

∘: The forming depth was 3.0 mm or more.

Δ: The forming depth was 2.5 mm or more and less than 3.0 mm.

x: The forming depth was less than 2.5 mm.

<Evaluation of Delamination>

The packaging materials obtained in the Examples and Comparative Examples were each cold-formed in a manner similar to the evaluation of forming depth, except that the forming depth of the forming apparatus was fixed at a rate of 3.5 mm. Thirty samples of such cold-formed bodies were prepared for each Example and Comparative Example, and a set of ten samples, another set of ten samples, and the other set of ten samples thereof were allowed to stand in a high-temperature environment (110° C.), in a high-temperature and high-humidity environment (60° C. at 95% RH), and in a high-temperature water environment (high-temperature water of 50° C.), respectively, for one week. Then, the number of samples where delamination occurred between the substrate layer 11 and the metal foil layer was counted for each environment, and evaluated according to the following criteria. The results are shown in Table 2.

∘: 0 samples

Δ: 1 to 3 samples x: 4 to 10 samples

TABLE 2

| | Electrolyte resistance | Forming depth | | Environmental test | | |
|---|---|---|---|---|---|---|
| | | mm | Evaluation | 110° C. | 65° C. at 95% RH | Hot water of 50° C. |
| Example 1 | Δ | 2.50 | Δ | ∘ | ∘ | Δ |
| Example 2 | Δ | 2.50 | Δ | ∘ | ∘ | ∘ |
| Example 3 | Δ | 2.50 | Δ | ∘ | ∘ | ∘ |
| Example 4 | ∘ | 3.00 | ∘ | ∘ | ∘ | ∘ |
| Example 5 | ∘ | 3.00 | ∘ | ∘ | ∘ | ∘ |
| Example 6 | ∘ | 2.50 | Δ | ∘ | ∘ | Δ |
| Example 7 | ∘ | 3.00 | ∘ | ∘ | ∘ | ∘ |
| Comparative Example 1 | x | 2.00 | x | ∘ | ∘ | Δ |
| Comparative Example 2 | x | 2.00 | x | ∘ | ∘ | Δ |
| Comparative Example 3 | x | 1.50 | x | ∘ | ∘ | x |
| Comparative Example 4 | x | 1.50 | x | ∘ | ∘ | x |
| Comparative Example 5 | ∘ | 1.50 | x | ∘ | ∘ | x |
| Comparative Example 6 | ∘ | 1.75 | x | ∘ | ∘ | x |
| Comparative Example 7 | ∘ | 2.00 | x | ∘ | ∘ | Δ |
| Comparative Example 8 | ∘ | 2.00 | x | ∘ | ∘ | Δ |
| Comparative Example 9 | ∘ | 1.25 | x | ∘ | ∘ | Δ |
| Comparative Example 10 | ∘ | 1.25 | x | ∘ | ∘ | Δ |
| Example 8 | ∘ | 3.50 | ∘ | ∘ | ∘ | ∘ |
| Example 9 | ∘ | 3.50 | ∘ | ∘ | ∘ | ∘ |
| Example 10 | ∘ | 3.50 | ∘ | ∘ | ∘ | ∘ |
| Example 11 | ∘ | 3.50 | ∘ | ∘ | ∘ | ∘ |

The power storage device packaging materials of the present Examples have a good balance between characteristics of formability, electrolyte resistance, and delamination suppression. While the present Examples each employ a heat lamination structure, a dry lamination structure achieved a similar tendency.

[Reference Signs List] 10 . . . Packaging material (power storage device packaging material); 11 . . . Substrate layer; 12 . . . Substrate protective layer; 13 . . . Adhesive layer; 14 . . . Metal foil layer; 15a, 15b . . . Anticorrosion treatment layer; 16 . . . Sealant adhesive layer; 17 . . . Sealant layer.

What is claimed is:

1. A power storage device packaging material, comprising at least a substrate protective layer, a substrate layer, an adhesive layer, a metal foil layer, a sealant adhesive layer, and a sealant layer in this order, wherein the substrate protective layer is a cured product of a raw material containing a polyester resin and a polyisocyanate compound, has a glass transition temperature (Tg) of 100 to 140° C., and has a thickness of 1 to 5 μm, with a ratio of the thickness of the substrate protective layer to a thickness of the substrate layer being 35% or less.

2. The power storage device packaging material of claim 1, further comprising an anticorrosion treatment layer on one or both surfaces of the metal foil layer.

3. The power storage device packaging material of claim 1, wherein the ratio of the thickness of the substrate protective layer to the thickness of the substrate layer is 3.5% or more.

4. The power storage device packaging material of claim 1, wherein the raw material further contains a filler.

5. The power storage device packaging material of claim 1, wherein the substrate layer is a polyamide film.

6. A method for manufacturing a power storage device packaging material, the method comprising:

adhering a substrate layer to one surface of a metal foil layer via an adhesive layer;

forming a substrate protective layer on a surface of the substrate layer on the opposite side of the adhesive layer; and forming a sealant layer on a surface of the metal foil layer on the opposite side of the adhesive layer via a sealant adhesive layer, wherein the substrate protective layer is a cured product of a raw material containing a polyester resin and a polyisocyanate compound, has a glass transition temperature (Tg) of 100 to 140° C., and has a thickness of 1 to 5 μm, with a ratio of the thickness of the substrate protective layer to a thickness of the substrate layer being 35% or less.

* * * * *